(12) United States Patent
Putcha

(10) Patent No.: US 7,766,370 B2
(45) Date of Patent: Aug. 3, 2010

(54) REAR PILLAR TO CENTER PILLAR TRIM JOINT CONNECTION FOR REAR SEAT PASSENGER AIRBAG SIDE CURTAIN DEPLOYMENT

(75) Inventor: Udayakrishna Putcha, Farmington Hills, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 541 days.

(21) Appl. No.: 11/694,406

(22) Filed: Mar. 30, 2007

(65) Prior Publication Data

US 2008/0238049 A1   Oct. 2, 2008

(51) Int. Cl.
*B60R 21/20* (2006.01)

(52) U.S. Cl. .................................. 280/728.3
(58) Field of Classification Search .............. 280/730.2, 280/728.2, 728.3
See application file for complete search history.

(56) References Cited

U.S. PATENT DOCUMENTS

| | | | |
|---|---|---|---|
| 6,168,191 B1 | 1/2001 | Webber et al. | |
| 6,364,346 B1 | 4/2002 | Preisler et al. | |
| 6,485,048 B2 * | 11/2002 | Tajima et al. | 280/728.2 |
| 6,863,300 B2 * | 3/2005 | Ryu | 280/730.2 |
| 6,883,828 B2 | 4/2005 | Ohki | |
| 7,134,682 B2 | 11/2006 | Totsuka et al. | |
| 7,410,189 B2 * | 8/2008 | Choi | 280/730.2 |

* cited by examiner

*Primary Examiner*—Paul N Dickson
*Assistant Examiner*—Robert A Coker
(74) *Attorney, Agent, or Firm*—Young Basile

(57) ABSTRACT

An interior trim structure covers a stowed side curtain airbag and allows deployment of the side curtain airbag through an interface joint to a position along a sidewall of a passenger compartment adjacent a rear seat location of a two-door coupe style vehicle. A center pillar trim piece and a rear pillar trim piece can be assembled to one another with at least one projection releasably interlocking with a corresponding aperture formed along adjacent edges of the trim pieces. Each projection is located in a complementary position with respect to a corresponding aperture formed along the adjacent edge to temporarily secure an interface joint defined between first and second edges when in an abutting relationship with respect to one another in a closed position. The interface joint defines an openable passage along the first and second abutting edges allowing deployment of a side curtain airbag through the interface joint.

17 Claims, 4 Drawing Sheets

REAR PILLAR TO CENTER PILLAR TRIM JOINT CONNECTION FOR REAR SEAT PASSENGER AIRBAG SIDE CURTAIN DEPLOYMENT

RELATED APPLICATIONS

This application is related to an application entitled "SIDE CURTAIN AIRBAG DIRECTIONAL DEPLOYMENT APPARATUS" filed contemporaneously herewith and identified as Ser. No. 11/694,520.

FIELD OF THE INVENTION

The present invention relates to an interior structure for covering a stowed side curtain airbag while allowing deployment of the side curtain airbag through an interface joint to a position along a sidewall of a passenger compartment adjacent to a rear seat location of a vehicle.

BACKGROUND

It is generally known for conventional airbag deployment to occur through a headliner assembly to an upper trim interface structure. However, for a coupe version vehicle, the headliner formation at the rear is not possible due to manufacturing limitations. It would be desirable to provide a rear pillar upper trim component capable of allowing airbag deployment. It would be desirable to provide a low pressure molded rear pillar trim covered with fabric. It would be desirable to provide an upper rear pillar trim having a joint interface with a lower center pillar trim. It would be desirable for the joint interface structure between the rear pillar trim and center pillar trim to facilitate airbag deployment.

SUMMARY

A rear passenger airbag deployment system for use in a coupe style vehicle includes a joint interface structure between a rear pillar trim component and a center pillar trim component. An interior trim structure for covering a stowed side curtain airbag allows deployment of the side curtain airbag along a sidewall of a passenger compartment of a vehicle. The interior trim structure includes a first trim piece having at least one aperture along a first edge, and a second trim piece having at least one low-retention force projection receivable within the aperture formed in the first trim piece. The projection can be formed along a second edge and located in complementary position with respect to the aperture of the first edge to temporarily secure an interface joint between the first and second edges along the first and second trim pieces with respect to one another when in a closed position. The interface joint defines an openable passage along the first and second edges of the interface joint allowing deployment of a side curtain airbag.

In an interior trim structure for deployment of a side curtain airbag along a sidewall of a passenger compartment adjacent a rear seat location of a vehicle, a group of low-retention force projections and complementary interlocking apertures can be formed along abutting first and second edges of a rear pillar trim piece and a center pillar trim piece to temporarily secure an interface joint defined between the abutting first and second edges along the trim pieces with respect to one another when in a closed position. The interface joint can define an openable passage through the interface joint between the first and second edges allowing deployment of a side curtain airbag.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
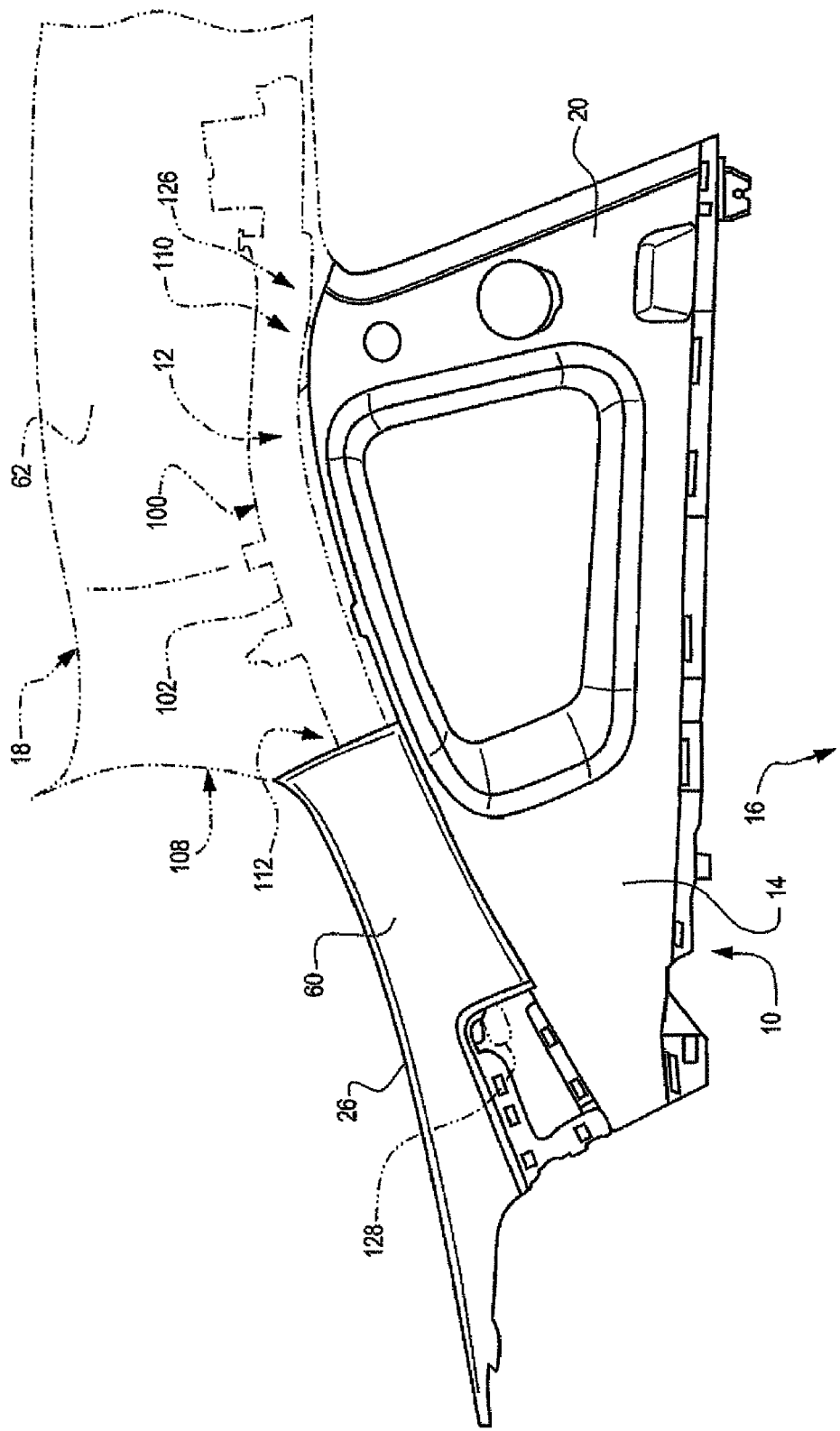
FIG. 1 is a side elevational view of a rear pillar trim piece and an interface joint with a center pillar trim piece.

Referring now to FIGS. 1-4, an interior trim structure 10 is illustrated for covering a stowed side curtain airbag 12, while allowing deployment of the side curtain airbag 12 along a sidewall 14 of a passenger compartment 16 in a vehicle 18. The interior trim structure 10 can include a first trim piece 20 having at least one aperture 22 formed along a first edge 24, and a second trim piece 26 having at least one low-retention force projection 28 receivable within the aperture 22 formed in the first trim piece 20. The projection 28 is formed along a second edge 30 of the second trim piece 26 and located in complementary position with respect to the aperture 22 of the first edge 24 of the first trim piece 20 to temporarily secure an interface joint 32 defined between the first and second edges 24,30 along the first and second trim pieces 20,26 with respect to one another when in a closed position 34, and to define an openable passage 36 along the interface joint 32 between the first and second edges 24,30 allowing deployment of a side curtain airbag 12. By way of example and not limitation, the first and second trim pieces 20,26 can include a center pillar trim component and a rear pillar trim component. The center pillar trim component 20 can define an interface joint 32 between adjoining first and second edges 24,30 with the rear pillar trim component 26. The interface joint 32 defines an openable passage 36 along the interface joint 32 between the first and second edges 24,30, allowing deployment of a side curtain airbag 12 through the interior trim structure 10 to a position along a sidewall 14 of a passenger compartment 16 adjacent a rear seat location of a two-door coupe style vehicle 18.

The at least one aperture 22 in the first trim piece 20 can include a first group of apertures 38 for locating and guiding movement of the first and second trim pieces 20,26 with respect to one another. A second group of apertures 40 can be provided for releasably locking the first and second trim pieces 20,26 in the closed position 34 with respect to one another. The at least one projection 28 of the second trim piece 26 can include a first group of projections 42 for locating and guiding movement of the first and second trim pieces 20,26 with respect to one another in cooperating with the first group of apertures 38. A second group of projections 44 can be provided for releasably locking the first and second trim pieces 20,26 in the closed position 34 with respect to one another in cooperation with the second group of apertures 40. In other words, the at least one aperture 22 and at least one projection 28 can include a first group of apertures 38 and corresponding projections 42 for locating and guiding movement of the first and second trim pieces 20,26 with respect to one another, and a second group of apertures 40 and corresponding projections 44 can be provided for releasably locking the first and second trim pieces 20,26 in the closed position 34 with respect to one another.

The projection 28 can include an elongate, generally L-shaped, member 46 having a locking tab 48 located on a distal end 50 for releasable engagement with a shoulder 52 defining a portion of the corresponding aperture 22. The at least one projection 28 can also include an elongated member 54 having a periphery 56 slidably engageable within a guiding surface 58 associated with the corresponding aperture 22 for locating the first and second trim pieces 20,26 with respect to one another. The projection 28 and corresponding aperture 22 provide a desired fit and finish tolerance of the interface joint 32 between the first and second edges 24,30 when in the closed position 34.

At least one of the trim pieces 20,26 can include a fabric covering 60. The first and second trim pieces 20,26 can include a center pillar trim piece formed of a high-pressure injection molded material defining a lower garnish assembly, and a rear pillar trim piece formed of a low pressure injection molded fabric covered material defining an upper garnish assembly. A plurality of connector receiving pockets 62 can be provided for securing the first and second trim pieces 20,26 to a body of the vehicle 18.

According to an embodiment of the present invention, an interior trim structure 10 for deployment of a side curtain airbag 12 along a sidewall 14 of a passenger compartment 16 adjacent a rear seat location of a vehicle 18 can include a group of low-retention force projections 44 and complementary interlocking apertures 40 along abutting first and second edges 24,30 of a rear pillar trim piece 26 and a center pillar trim piece 20 to temporarily secure an interface joint 32 defined between the abutting first and second edges 24,30 along the trim pieces 20,26 with respect to one another when in a closed position 34, and to define an openable passage 36 through the interface joint 32 between the first and second edges 24,30 allowing deployment of a side curtain airbag 12. Optionally, at least one locator guide projection 42 and complementary receiving aperture 38 can be formed along the abutting first and second edges 24,30 of the trim pieces 20,26 to align the interface joint 32 defined between the first and second edges 24,30 along the trim pieces 20,26 with respect to one another in the closed position 34 and to guide opening movement of the interface joint 32 during deployment of a side curtain airbag 12. Alternatively, a group of locator guide projections 42 and complementary receiving apertures 38 formed along the abutting first and second edges 24,30 of the trim pieces 20,26 can align the interface joint 32 defined between the first and second edges 24,30 along the trim pieces 20,26 with respect to one another in the closed position 34, and can guide opening movement of the interface joint 32 during deployment of a side curtain airbag 12.

The low-retention force projection 44 can include an elongate, generally L-shaped, member 46 having a locking tab 48 located on a distal end 50 for releasable engagement with a shoulder 52 defining a portion of the corresponding aperture 40. The locator guide projection 42 can include an elongate member 54 having a periphery 56 slidably engageable with a guiding surface 58 associated with the corresponding aperture 38 for locating the trim pieces 20,26 with respect to one another. The combination of projections 42,44 and corresponding apertures 38,40 provide a desired fit and finish tolerance of the interface joint 32 when in the closed position 34. A fabric covering 60 can be provided for at least one of the trim pieces 20,26. In one embodiment of the invention, the fabric covering 60 can be provided on the rear pillar trim piece 26.

Figure 2:
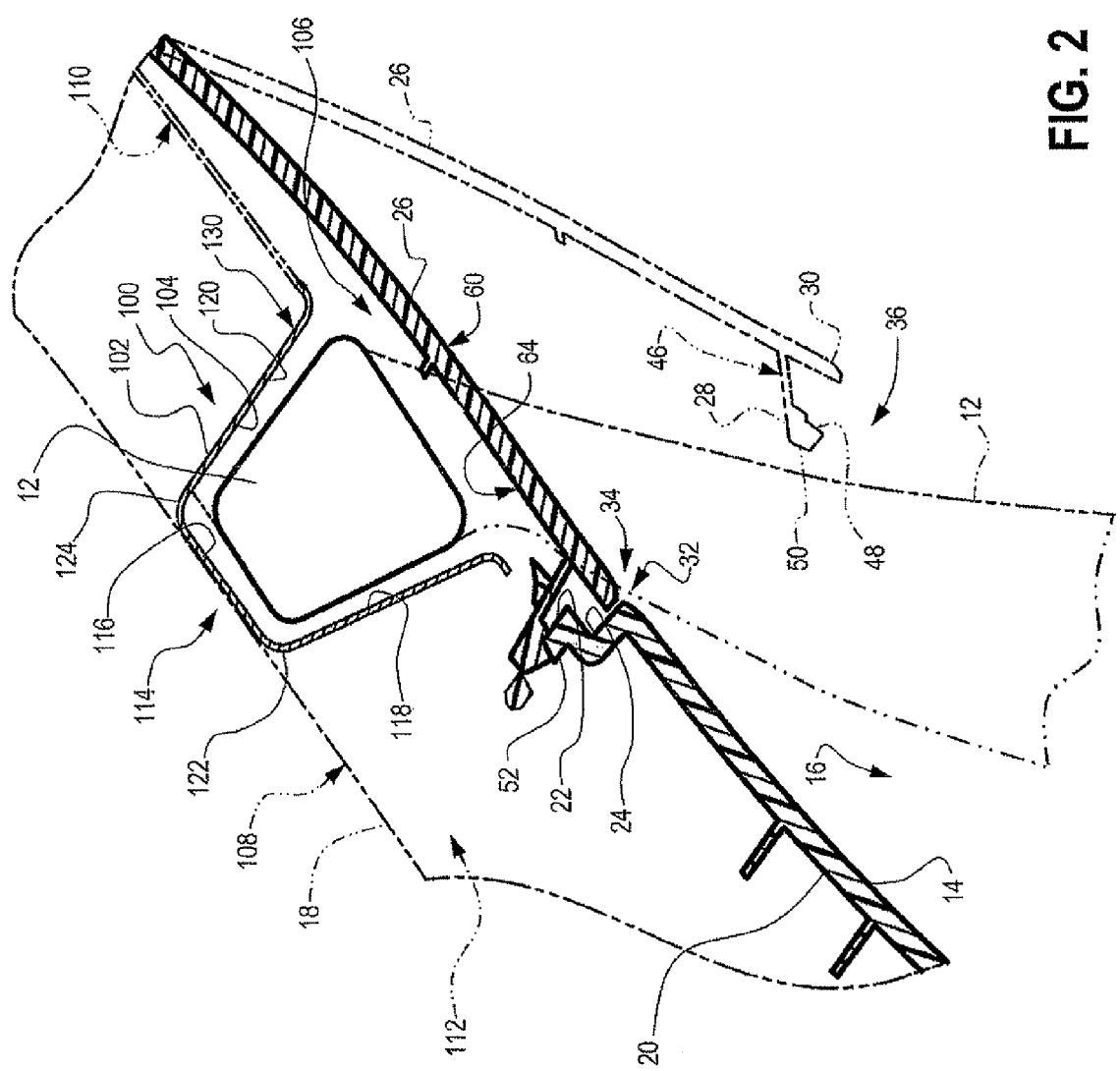
FIG. 2 is a cross-sectional view of the interface joint between the rear pillar trim component and the center pillar trim component, including a low-retention force projection of one trim piece receivable within an aperture formed in the other trim piece.
Figure 3:
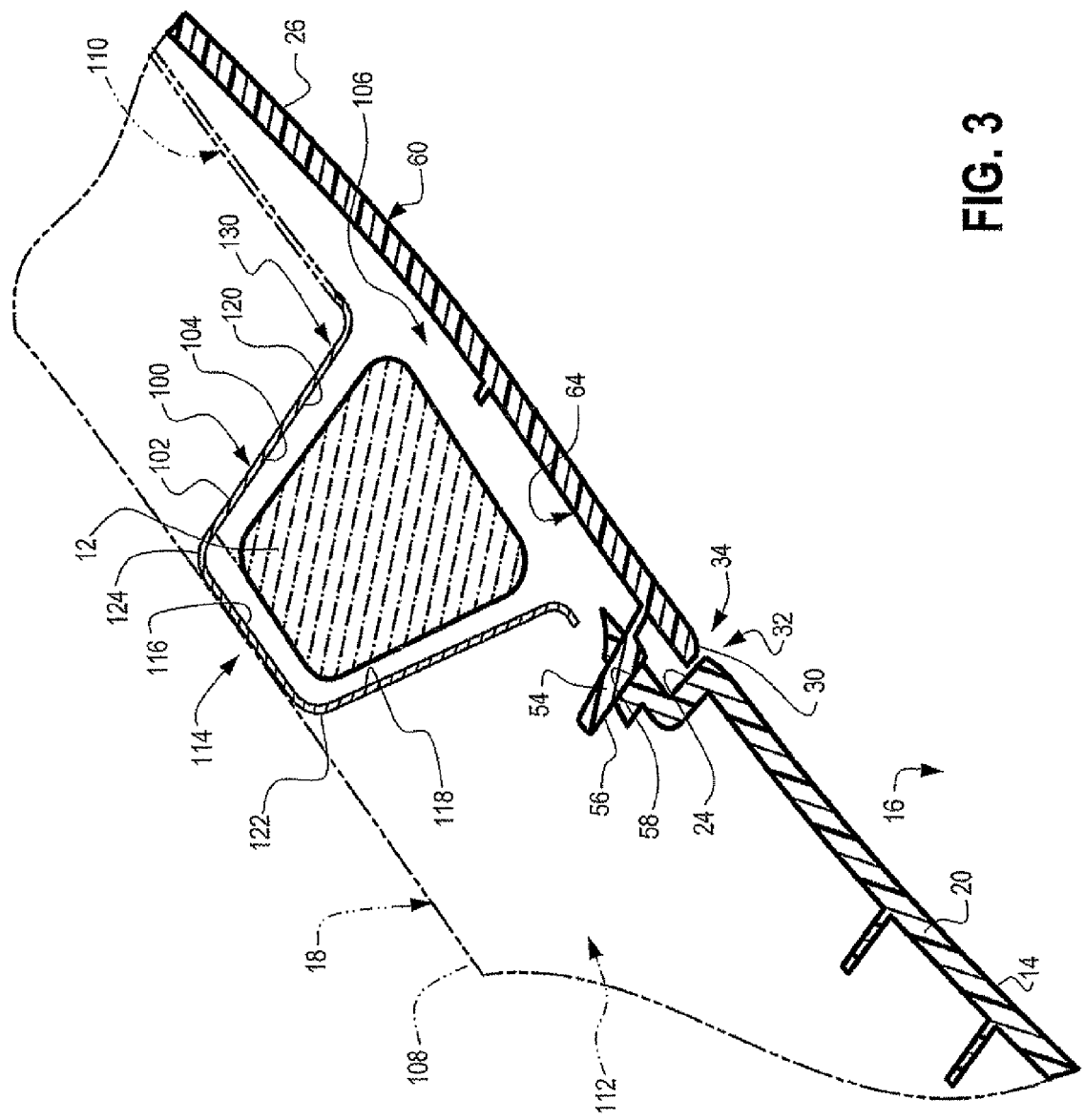
FIG. 3 is a cross-sectional view showing a locating and guiding projection formed on one trim component releasably engageable within a locating and guiding aperture formed in the other component.
Figure 4:
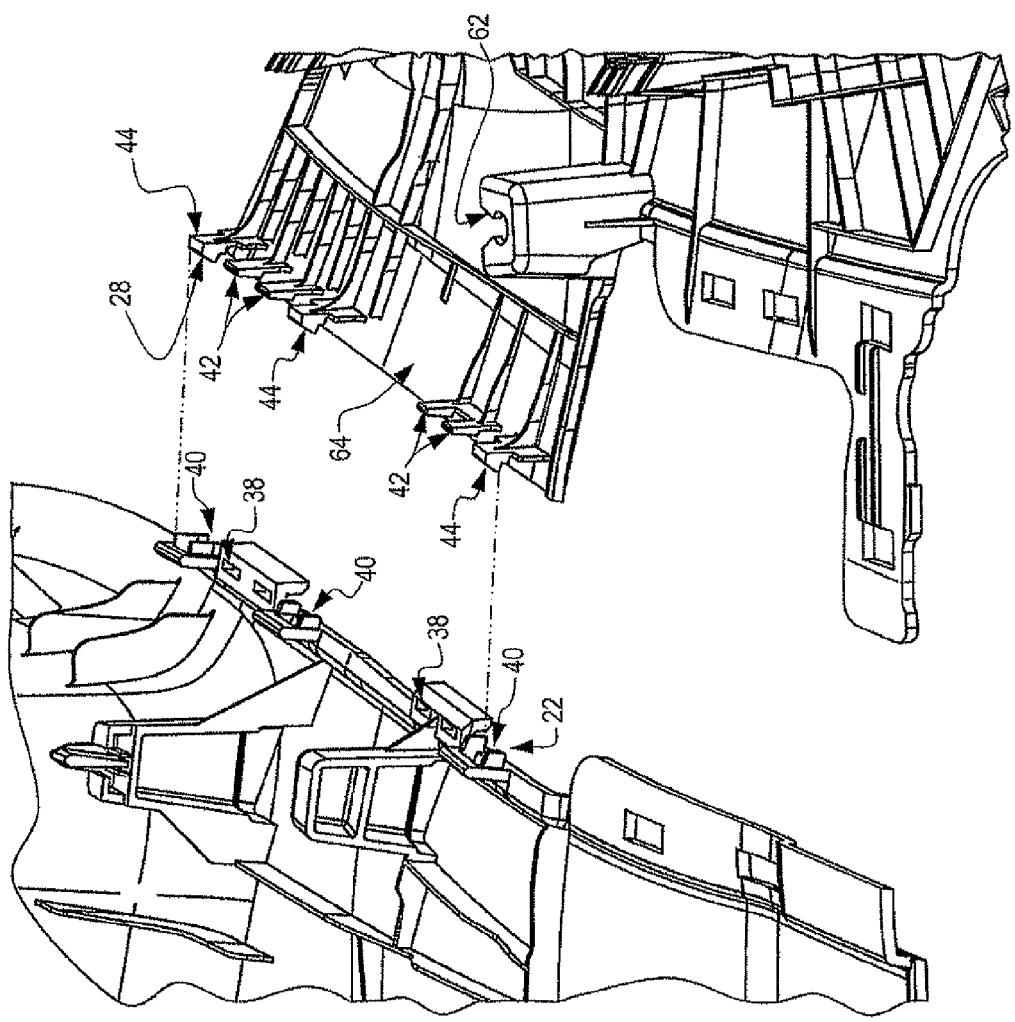
FIG. 4 is a perspective, exploded rear view of the interface joint defined between first and second edges along a rear pillar trim piece and a center pillar trim piece to define an openable passage along the interface joint, allowing deployment of a side curtain airbag along a sidewall of a passenger compartment adjacent a rear seat location of a two-door coupe style vehicle.

As seen in FIG. 1, a side curtain airbag 12 is initially installed above the center pillar trim component 20 between the upper edge and the headliner 62. The stowed side curtain airbag 12 extends along the upper edge of the center pillar trim component 20 to be enclosed by the rear pillar trim component 26, so that the interface joint 32 defines an openable passage 36 between first and second adjoining edges 24,30 allowing deployment of the side curtain airbag 12 along the sidewall 14 of the passenger compartment 16 of the vehicle 18. As best seen in FIGS. 2 and 3, the side curtain airbag 12 is directed toward the inner surface 64 of the rear pillar trim component 26 in order to disengage the low-retention force projection 28 from the corresponding aperture 22, while the locating and guiding projections 42 cooperatively interact with the locating and guiding apertures 38 to guide the opening movement of the rear pillar trim component 26 from the closed position 34, shown in solid line in FIG. 2, to the openable passage 36, as shown in phantom in FIG. 2.

Referring to FIGS. 1-3, an embodiment of the invention includes an apparatus 100 for guiding deployment of a stowed side curtain airbag 12 along a sidewall 14 of a passenger compartment 16 in a vehicle 18. The apparatus 100 can include at least one trim piece 20 and/or 26 defining at least a portion of an openable passage 36 along an interface joint 32 allowing deployment of a side curtain airbag 12. At least one guide member 102 extends longitudinally along at least a portion of the stowed side curtain airbag 12 and includes at least one guide ramp 104 directing deployment of the side curtain airbag 12 toward the openable passage 36 defined at least in part by the at least one trim piece 20 and/or 26. The guide member 102 surrounds the side curtain airbag 12 on three sides to define an airbag deployment opening 106 facing a rear surface 64 of at least one of the trim piece 20 and/or 26 adjacent the openable passage 36.

The guide member 102 can be associated with at least one of a trim piece 20, 26, a body bracket 108, a pillar bracket 110, or any combination thereof. The guide member 102 positions the stowed side curtain airbag 12 at a constant distance from a back side 64 of the covering trim piece 20 and/or 26 along a corresponding length of the guide member 102. The guide member 102 is shaped to follow a styling path of a structural pillar 112 of the vehicle 18. The guide member 102 extends inwardly from the structural pillar 112 of the vehicle 18 toward a back side 64 of the trim piece 20, 26.

The guide member 102 can include a generally U-shaped cross section 114. The U-shaped cross section 114 of the guide member 102 can include a rear wall portion 116 spaced from the covering trim piece 20 and/or 26, and two side wall portions 118,120 extending from opposite edges 122,124 of the rear wall portion 116 toward the covering trim piece 20 and/or 26. Each side wall portion 118,120 defines an obtuse angle with respect to the rear wall portion 116 of the guide member 102.

The guide member 102 extends longitudinally along the structural pillar 112 between a forward location 126 and a rearward location 128 with respect to the vehicle 18. The guide member 102 can be formed with an energy absorbing guide ramp 130 of sufficient strength to guide deployment of the side curtain airbag 12 toward an interior passenger compartment 16 of the vehicle 18, while being formed to absorb energy from an impact originating internally from within the vehicle 18.

An interface joint 32 can define at least a portion of the openable passage 36 located between a first edge 24 of one trim piece 20 or 26 and a second edge 30. At least one trim piece 20 and/or 26 can include a first trim piece 20 having at least one aperture 22 formed along the first edge 24, and a second trim piece 26 having at least one low-retention force projection 28 receivable within the aperture 22 formed in the first trim piece 20. The projection 28 is formed along a second edge 30 of the second trim piece 26 and is located in complementary position with respect to the aperture 22 of the first edge 24 of the first trim piece 20 to temporarily secure an interface joint 32 defined between the first and second edges 24,30 along the first and second trim pieces 20,26 with respect to one another when in a closed position and to define an openable passage 36 along the interface joint 32 between the first and second edges 24,30 allowing deployment of the side curtain airbag 12. The guide member 102 directs airbag deployment toward the openable passage 36 defined along the interface joint 32 between the first and second edges 24,30.

The projection 28 can include an elongate, generally L-shaped, member 46 having a locking tab 48 located on a distal end 50 for releasable engagement with a shoulder 52 defining a portion of the corresponding aperture 22. The projection 28 can include, alternatively or additionally, an elongate member 54 having a periphery 56 slideably engageable within a guiding surface 58 of aperture 22 for locating the first and second trim pieces 20,26 with respect to one another.

In an interior trim structure 10 for deployment of a side curtain airbag 12 along a sidewall 14 of a passenger compartment 16 adjacent to a rear seat location of a vehicle 18, an embodiment of the invention includes a group of low-retention force projections 44 and complementary interlocking apertures 40 formed along abutting first and second edges 24,30 of a rear pillar trim piece 26 and a center pillar trim piece 20 to temporarily secure an interface joint 32 defined between the abutting first and second edges 24,30 along the trim pieces 20,26 with respect to one another when in a closed position, and to define an openable passage 36 through the interface joint 32 between the first and second edges 24,30 allowing deployment of a side curtain airbag 12. The embodiment can include at least one guide member 102 extending longitudinally along at least a portion of the stowed side curtain airbag 12 and including at least one guide ramp 104 directing deployment of the side curtain airbag 12 toward the openable passage 36. The guide member 102 surrounds the side curtain airbag 12 on three sides to define an airbag deployment opening 106 facing a rear surface 64 of the trim piece 20 and/or 26 adjacent the openable passage 36.

The guide member 102 can extend inwardly from a structural pillar 112 of the vehicle 18 toward a backside 64 of at least one of the trim pieces 20 and/or 26. The guide member 102 can include a generally U-shaped cross section 114 having a rear wall portion 116 spaced from at least one of the trim pieces 20 and/or 26, and two side wall portions 118,120 extending from opposite edges 122,124 of the rear wall portion 116 toward the at least one of the trim pieces 20 and/or 26. At least one side wall portion 118,120 defines an obtuse angle with respect to the rear wall portion 116 of the guide member 102.

The projection 28 can include a low-retention force projection 44 formed as an elongate, generally L-shaped member 46 having a locking tab 48 located on a distal end 50 for releasable engagement with a shoulder 52 defining a portion of the corresponding aperture 40. The projection 28 can include a locating guide projection 42 formed as an elongate member 54 having a periphery 56 engageable with a guiding surface 58 associated with a corresponding aperture 38 for locating the trim pieces 20,26 with respect to one another.

According to an embodiment of the invention, an interior trim structure 10 covers a stowed side curtain airbag 12 and allows deployment of the side curtain airbag 12 through the interior trim structure 10 to a position along a sidewall 14 of a passenger compartment 16 adjacent to a rear seat location of a two door coupe style vehicle 18. The interior trim structure can include a center pillar trim piece 20 and a rear pillar trim piece 26. The rear pillar trim piece can be assembled to the center pillar trim piece. At least one projection 28 is receiveable within, and releasably interlocking with, a corresponding aperture 22 formed in one of the trim pieces 20 or 26. The projection 28 is formed along a second edge 30 of another of the trim pieces 20 or 26. Each projection is located in a complementary position with respect to the corresponding aperture 22 formed along the first edge 24 to temporarily secure an interface joint 32 defined between the first and second edges 24,30 when in an abutting relationship with respect to one another in a closed position, and defines an openable passage 36 along the interface joint 32 between the first and second edges 24,30 allowing deployment of the side curtain airbag 12 through the interface joint 32. At least one guide member 102 extends longitudinally along at least a portion of the stowed side curtain airbag 12 and includes at least one guide ramp 104 directing deployment of the side curtain airbag 12 toward the openable passage 36. The guide member 102 surrounds the side curtain airbag 12 on three sides to define an airbag deployment opening 106 facing a rear surface 64 of at least one of the trim pieces 20 and/or 26 adjacent to the openable passage 36. The guide member 102 extends inwardly from a structural pillar 112 of the vehicle 18 toward a backside 64 of at least one of the trim pieces 20 and/or 26, and two side wall portions 118,120 extend from opposite edges 122,124 of a rear wall portion 116 toward at least one of the trim pieces 20 and/or 26.

In operation, as the stowed side curtain airbag 12 is inflated for deployment, the three side wall portions 116,118,120 of the guide 102 direct expansion and deployment of the side curtain airbag 12 toward the back surface 64 of at least one of the trim pieces 20 and/or 26 applying sufficient pressure in order to release the low-retention force projection 44 from the corresponding aperture 40. More particularly, the locking tab 48 located on an outer end 50 is released from engagement with shoulder 52 defining a portion of the corresponding aperture 40. As the interface joint 32 is opened to define openable passage 36, locating guide projections 42 slidingly engage an outer periphery 56 with guiding surface 58 associated with the corresponding aperture 38. After the interface joint 32 has separated the two adjacent edges 24,30 with respect to one another to define the openable passage 36, the side curtain airbag 12 continues expansion deploying through the openable passage 36 formed between the two trim pieces 20,26. If desired, a fabric covering 60 can optionally be provided for one or both of the trim pieces 20,26.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An interior trim structure for covering a stowed side curtain airbag while allowing deployment of the side curtain airbag along a side wall of a passenger compartment of a vehicle, comprising:
   a first trim piece having a first engagement structure;
   a second trim piece having a second engagement structure that is engageable with the first engagement structure to temporarily secure an interface joint defined between the first trim piece and the second trim piece in a closed position and to define an openable passage along the interface joint to allow deployment of a side curtain airbag; and
   the second engagement structure including a first group of projections for locating and guiding movement of the first trim piece with respect to the second trim piece, and a second group of projections for releasably locking the first and second trim pieces in the closed position with respect to one another.

2. The interior trim structure of claim 1, wherein the first engagement structure further comprises:
   a first group of apertures for locating and guiding movement of the first and second trim pieces with respect to one another, and a second group of apertures for releasably locking the first and second trim pieces in the closed position with respect to one another.

3. The interior trim structure of claim 1, further comprising:
   the first engagement structure including a first group of apertures that correspond to the first group of projections of the second engagement structure for locating and guiding movement of the first and second trim pieces with respect to one another; and
   the first engagement structure including a second group of apertures that correspond to the second group of projections of the second engagement structure for releasably locking the first and second trim pieces in the closed position with respect to one another.

4. The interior trim structure of claim 3, further comprising:
   each projection of the second group of projections of the second engagement structure including an elongate, generally L-shaped, member having a locking tab located on a distal end for releasable engagement with a shoulder defining a portion of a corresponding aperture of the second group of apertures of the first engagement structure.

5. The interior trim structure of claim 3, further comprising:
   each projection of the second group of projections of the second engagement structure including an elongate member having a periphery slidingly engageable with a guiding surface associated with a corresponding aperture of the first group of apertures of the first engagement structure for locating the trim pieces with respect to one another.

6. The interior trim structure of claim 1, wherein engagement of the first engagement structure with the second engagement structure provides a desired fit and finish tolerance of the interface joint between the first and second trim pieces when in a closed position.

7. An interior trim structure for deployment of a side curtain airbag along a side wall of a passenger compartment adjacent to a rear seat location of a vehicle, the interior trim structure comprising:
   a first trim panel having a first edge;
   a second trim panel having a second edge abutting the first edge of the first trim panel to define an interface joint between the first trim panel and the second trim panel; and
   a first locating structure that is formed along the first edge of the first trim panel and a second locating structure that is formed along the second edge of the second trim panel, wherein the first locating structure is engageable with the second locating structure to align the first edge of the first trim panel and the second edge of the second trim panel with respect to one another and to define the interface joint in a closed position and to guide movement of the interface joint from the closed position to an open position during deployment of the side curtain airbag;
   a first locking structure formed on the first edge of the first trim panel, the first locking structure including at least one elongate, generally L-shaped member having a locking tab located on a distal end; and
   a second locking structure formed on the second edge of the second trim panel, the second locking structure including at least one corresponding aperture, wherein the locking tab of the generally L-shaped member of the first locking structure is releasably engageable with a shoulder defining a portion of the corresponding aperture for releasably locking the first trim panel and the second trim panel in the closed position with respect to one another.

8. The interior trim structure of claim 7, further comprising:
   the first locating structure including a group of locator guide projections formed along the first edge of the first trim panel and the second locating structure including a group of complementary receiving apertures that are formed along the second edge of the second trim panel to align the first edge of the first trim panel and the second edge of the second trim panel with respect to one another to define the interface joint in the closed position and to guide movement of the interface joint from the closed position to the open position during deployment of the side curtain airbag.

9. The interior trim structure of claim 7, further comprising:
   the first locating structure including at least one elongate member and the second locating structure including at least one corresponding aperture, the elongate member of the first locating structure having a periphery that is slidingly engageable with a guiding surface associated with the corresponding aperture of the second locating structure for locating the first trim panel and the second trim panel with respect to one another.

10. The interior trim structure of claim 7, wherein the first locating structure and the second locating structure provide a desired fit and finish tolerance of the interface joint when in a closed position.

11. The interior trim structure of claim 7, further comprising:
   a first engagement structure that is formed on the first edge of the first trim panel and a second engagement structure that is formed on the second edge of the second trim panel, the second engagement structure including at least one low retention force projection, the first engagement structure including at least one complementary interlocking aperture, wherein the at least one low retention force projection of the second engagement structure is engageable with the at least one complementary interlocking aperture of the first engagement structure to temporarily secure the first edge of the first trim panel and the second edge of the second trim panel with respect to one another to define the interface joint in a closed position and to define an openable passage through the interface joint between the first edge of the first trim panel and the second edge of the first trim panel to allow deployment of the side curtain airbag.

12. An interior trim structure for covering a stowed side curtain airbag and for allowing deployment of the side curtain airbag through the interior trim structure to a position along a side wall of a passenger compartment adjacent a rear seat location of a vehicle, the interior trim structure comprising:

a center pillar trim piece that conceals at least a portion of a center structural pillar of the vehicle as well as at least a portion of a rear structural pillar of the vehicle;

a rear pillar trim piece that conceals at least a portion of the structural rear pillar of the vehicle;

a first edge formed on one of the center pillar trim piece or the rear pillar trim piece and a second edge formed on the other of the center pillar trim piece or the rear pillar trim piece; and at least one projection formed on the second edge, the at least one projection receivable within and releasably interlocking with at least one corresponding aperture formed on the first edge to temporarily secure the first edge with respect to the second edge to define an interface joint in a closed position and to define an openable passage along the interface joint between the first edge and the second edge to allow deployment of a side curtain airbag through the interface joint, wherein the interface joint extends longitudinally along the rear structural pillar of the vehicle, and the openable passage is configured and arranged such that the side curtain airbag extends downward through the openable passage and substantially overlies the center pillar trim piece along at least the majority of the openable passage defined by the interface joint upon deployment of the side curtain airbag.

13. The interior trim structure of claim 12, wherein the first edge is disposed on the center pillar trim piece and the second edge is disposed on the rear pillar trim piece.

14. The interior trim structure of claim 13, wherein the second edge is positioned above the first edge to define the interface joint when the first edge of the center pillar trim piece and the second edge of the rear pillar trim piece are in an abutting relationship with respect to one another in the closed position.

15. An interior trim structure for covering a stowed side curtain airbag while allowing deployment of the side curtain airbag along a side wall of a passenger compartment of a vehicle comprising:

a first trim panel having a first edge;

a second trim panel having a second edge;

an interface joint defined between the first and second edges along the first and second trim panels, the interface joint being selectively openable upon deployment of a side curtain airbag such that the first edge of the first trim panel is spaced from the second edge of the second trim panel, wherein the first trim panel is connected to the second trim panel solely by the interface joint to allow complete separation of the first trim panel from the second trim panel upon deployment of the side curtain airbag;

a first engagement structure formed along the first edge of the first trim panel and a second engagement structure formed along the second edge of the second trim panel, wherein the second engagement structure is engageable with the first engagement structure to temporarily secure the interface joint when in a closed position and to define an openable passage along the interface joint between the first and second edges allowing deployment of the side curtain airbag; and the second engagement structure including a first group of projections that are engageable with the first engagement structure for locating and guiding movement of the first trim panel with respect to the second trim panel, and a second group of projections that are engageable with the first engagement structure for releasable locking the first trim panel and the second trim panel in the closed position with respect to one another.

16. The interior trim structure of claim 15, wherein the side curtain airbag is positioned in a stowed condition proximate to the interface joint.

17. The interior trim structure of claim 16, wherein the second trim panel is positioned above the first trim panel, and the side curtain airbag is positioned in a stowed condition between the second trim panel and an interior surface of a body of the vehicle.

* * * * *